United States Patent
Yamaki et al.

(10) Patent No.: US 11,447,881 B2
(45) Date of Patent: Sep. 20, 2022

(54) ION EXCHANGE MEMBRANE FOR ALKALI CHLORIDE ELECTROLYSIS AND ALKALI CHLORIDE ELECTROLYSIS APPARATUS

(71) Applicant: AGC Inc., Chiyoda-ku (JP)

(72) Inventors: Yasushi Yamaki, Chiyoda-ku (JP); Takayuki Kaneko, Chiyoda-ku (JP); Hiromitsu Kusano, Chiyoda-ku (JP); Takuo Nishio, Chiyoda-ku (JP); Kazuo Umemura, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 34 days.

(21) Appl. No.: 15/491,272

(22) Filed: Apr. 19, 2017

(65) Prior Publication Data

US 2017/0218526 A1 Aug. 3, 2017

Related U.S. Application Data

(63) Continuation of application No. PCT/JP2015/081377, filed on Nov. 6, 2015.

(30) Foreign Application Priority Data

Nov. 7, 2014 (JP) .............................. JP2014-227273

(51) Int. Cl.
*C25B 1/46* (2006.01)
*C25B 13/08* (2006.01)
(Continued)

(52) U.S. Cl.
CPC ................ *C25B 1/46* (2013.01); *B01D 69/10* (2013.01); *B01D 71/32* (2013.01); *B01D 71/82* (2013.01);
(Continued)

(58) Field of Classification Search
CPC .... C25B 1/46; C25B 9/08; C25B 9/10; C25B 13/00; C25B 13/02; C25B 13/04;
(Continued)

(56) References Cited

U.S. PATENT DOCUMENTS

| 2007/0161718 A1* | 7/2007 | Umemura | C08J 5/2237 521/27 |
| 2012/0234674 A1* | 9/2012 | Kameyama | C25B 13/02 204/252 |
| 2014/0360868 A1* | 12/2014 | Yamaki | B01J 39/20 204/296 |

FOREIGN PATENT DOCUMENTS

| CN | 1624202 A | 6/2005 |
| CN | 102336043 A * | 2/2012 |

(Continued)

OTHER PUBLICATIONS

Machine Translation of CN 102336043 A (Year: 2019).*

(Continued)

*Primary Examiner* — Alexander W Keeling
(74) *Attorney, Agent, or Firm* — Oblon, McClelland, Maier & Neustadt, L.L.P.

(57) ABSTRACT

To provide an ion exchange membrane for alkali chloride electrolysis for which membrane strength is increased while membrane resistance is reduced to reduce electrolysis voltage during alkali chloride electrolysis and which prevents peeling between layers (S) and a layer (C). The ion exchange membrane for alkali chloride electrolysis comprises a layer (C) which comprises a fluorinated polymer having carboxylic acid functional groups, at least two layers (S) which comprise a fluorinated polymer having sulfonic acid functional groups, and a reinforcing material, wherein the layers (S) include a layer (Sa) and a layer (Sb), the layer (Sa) is a layer which is adjacent to the layer (C), the layer (Sb) is a layer which is not adjacent to the layer (C), the reinforcing (Continued)

material is disposed in the layer (Sb) substantially in parallel to the layer (Sb) in a state not in contact with the layer (Sa), and the ion exchange capacity of the layer (Sa) is lower than the ion exchange capacity of the layer (Sb).

16 Claims, 2 Drawing Sheets

(51) Int. Cl.
  *B01D 69/10* (2006.01)
  *C25B 9/23* (2021.01)
  *B01D 71/32* (2006.01)
  *C08J 5/22* (2006.01)
  *B01D 71/82* (2006.01)

(52) U.S. Cl.
  CPC ............... *C08J 5/2237* (2013.01); *C25B 9/23* (2021.01); *C25B 13/08* (2013.01); *C08J 2327/12* (2013.01)

(58) Field of Classification Search
  CPC .................... C25B 13/08; B01D 69/10; B01D 71/06–71/82; H01M 2/14–2/185
  See application file for complete search history.

(56) References Cited

FOREIGN PATENT DOCUMENTS

| | | |
|---|---|---|
| CN | 102336043 A | 2/2012 |
| CN | 103014758 B | 6/2014 |
| JP | 8-120100 | 5/1996 |
| JP | 2013-163857 | 8/2013 |
| JP | 2013-163858 | 8/2013 |
| JP | 2014-58707 | 4/2014 |
| JP | 2014-140843 | 8/2014 |
| WO | WO 2013/129399 | 9/2013 |
| WO | WO-2013129399 A1 * 9/2013 ............. B01J 39/20 |

OTHER PUBLICATIONS

Reganold et al ("Expressing cation exchange capacity in milliequivalents per 100 grams and in SI units", Journal of Agronomic Education, vol. 14, No. 2, pp. 84-90) (Year: 1985).*
Google Patent translation of CN 102336043 A (Year: 2020).*
International Search Report dated Dec. 8, 2015 in PCT/JP2015/081377, filed on Nov. 6, 2015.

* cited by examiner

ION EXCHANGE MEMBRANE FOR ALKALI CHLORIDE ELECTROLYSIS AND ALKALI CHLORIDE ELECTROLYSIS APPARATUS

TECHNICAL FIELD

The present invention relates to an ion exchange membrane alkali chloride electrolysis and an alkali chloride electrolysis apparatus.

BACKGROUND ART

As an ion exchange membrane to be used in an alkali chloride electrolysis method for producing an alkali hydroxide and chlorine by electrolyzing an alkali chloride aqueous solution such as seawater, an electrolyte membrane made of a fluorinated polymer having ion exchange groups (carboxylic acid functional groups, sulfonic acid functional groups, etc.) is known. In order to maintain the mechanical strength and dimensional stability, the electrolyte membrane is usually reinforced by a reinforcing material made of woven fabric obtained by plain weave of e.g., polytetrafluoroethylene (hereinafter referred to as PTFE) yarn.

As an ion exchange membrane for alkali chloride electrolysis having a reinforcing material, for example, an ion exchange membrane having the following (1) to (4) laminated in this order, is known (Patent Document 1):

(1) a polymer A layer comprising a fluorinated polymer having carboxylic acid functional groups and having an ion exchange capacity of 0.8 meq/g dry resin, (2) a polymer B layer comprising a fluorinated polymer having sulfonic acid functional group and having an ion exchange capacity of 0.98 meq/g dry resin, (3) a reinforcing material, (4) a polymer C layer comprising a fluorinated polymer having sulfonic acid functional groups and having an ion exchange capacity of 1.05 meq/g dry resin.

PRIOR ART DOCUMENT

Patent Document

Patent Document 1: JP-A-2013-163858

DISCLOSURE OF INVENTION

Technical Problem

A fluorinated polymer having carboxylic acid functional groups be used for an ion exchange membrane has a low ion exchange capacity, as compared with a fluorinated polymer having sulfonic acid functional groups, and one having a lower water content is used in many cases. Therefore, in the case of the ion exchange membrane of Patent Document 1, if the ion exchange capacity of the polymer B layer is made high, in order to lower the membrane resistance, when liquid circulating becomes insufficient at a portion in the anode chamber, the difference in water content increases due to the difference in the ion exchange capacity between the polymer B layer, and the peeling (so-called water blisters) due to the difference in electrodialysis water between the polymer B layer and C layer may occur. On the other hand if the ion exchange capacity of the polymer B layer is made small, the peeling due to water blisters may be suppressed, and the peeling resistance may be improved, but since the ion exchange capacity is small, the membrane resistance becomes high, whereby the electrolysis voltage will be increased. Although a method of reducing the membrane resistance by reducing the thickness of the polymer B layer having a small ion exchange capacity as far as possible, while securing the peeling resistance by reducing the ion exchange capacity of the polymer B layer, is conceivable, if the polymer B layer is thin, the reinforcing material becomes closer in position to the polymer A layer, and the effect shielding the transfer of alkali metal ions by the reinforcing material tends to be remarkable, whereby the membrane resistance rather tends to be high.

Thus, in the construction of the conventional ion exchange membrane, it has been difficult to obtain an ion exchange membrane whereby both electrolysis voltage and peeling resistance are satisfied.

It is an object of the present invention to provide an ion exchange membrane for alkali chloride electrolysis, whereby the membrane strength is high, the membrane resistance is low so that it is possible to reduce the electrolysis voltage during alkali chloride electrolysis, and it is possible to prevent peeling between a layer (S) which comprises t fluorinated polymer having sulfonic acid functional groups and a layer (C) which comprises a fluorinated polymer having carboxylic acid functional groups, and an alkali chloride electrolysis apparatus using such an ion exchange membrane for alkali chloride electrolysis.

Solution to Problem

The gist of the present invention is in the following [1] to [11].

[1] An ion exchange membrane for alkali chloride electrolysis, comprising a layer (C) which comprises a fluorinated polymer having carboxylic acid functional groups, at least two layers (S) which comprise a fluorinated polymer having sulfonic acid functional groups, and a reinforcing material, wherein said layers (S) include a layer (Sa) and a layer (Sb), said layer (Sa) which is adjacent to the layer (C), said layer (Sb) is a layer which is not adjacent to the layer (C), said reinforcing material is disposed in said layer (Sb) substantially in parallel with the layer (Sb) in a state not in contact with said layer (Sa) and the ion exchange capacity of said layer (Sa) is lower than the ion exchange capacity of said layer (Sb).

[2] The ion exchange membrane for alkali chloride electrolysis according to the above [1], wherein the difference between the ion exchange capacity of the layer (Sa) and the ion exchange capacity of the layer (Sb) is from 0.01 to 0.5 meq/g dry resin.

[3] The ion exchange membrane for alkali chloride electrolysis according to the above [1] or [2] wherein the ion exchange capacity of the layer (Sb) is from 0.51 to 2.01 meq/g dry resin.

[4] The ion exchange membrane for alkali chloride electrolysis according to any one of the above [1] to [3], wherein the reinforcing material is disposed at a position where the ratio of the thickness of the layer (Sb) located on the opposite side to the layer (C) via the reinforcing member in the layer (Sb), to the thickness of the layers (S), becomes to be from 0.05 to 0.6.

[5] The ion exchange membrane for alkali chloride electrolysis according to any one of the above [1] to [4], wherein the ratio of the thickness of the layer (Sa) to the thickness of the layer (Sb) is at most 0.4.

[6] The ion exchange membrane for alkali chloride electrolysis according to any one of the above [1] to [5], wherein the thickness of the layer (Sa) is from 1 to 50 μm.

[7] The ion exchange member for alkali chloride electrolysis according to any one of the above [1] to [6], wherein the total thickness of the layer (Sa) and the layer (Sb) located on the layer (C) side via the reinforcing material is from 30 to 140 μm, and the thickness of the layer (Sb) located on the opposite side to the layer via the reinforcing material is from 10 to 60 μm.

[8] The ion exchange membrane for alkali chloride electrolysis according to any one of the above [1] to [7], wherein the difference between the ion exchange capacity of the layer (C) and the ion exchange capacity of the layer (SA) is at most 0.5 meq/g dry resin.

[9] The ion exchange membrane for alkali chloride electrolysis according to any one of the above [1] to [8], wherein the ion exchange capacity of the layer (C) is from 0.5 to 2.0 meq/g dry resin, and the ion exchange capacity of the layer (Sc) is from 0.5 to 2.0 meq/g dry resin.

[10] The ion exchange membrane for alkali chloride electrolysis according to any one of the above [1] to [9], wherein the thickness of the layer (C) is from 5 to 50 μm.

[11] An alkali chloride electrolysis apparatus comprising an electrolytic cell provided with a cathode and an anode, and an ion exchange membrane for alkali chloride electrolysis as defined in any one of the above [1] to [10], which is mounted in the electrolytic cell so as to partition inside of the electrolytic cell into a cathode chamber on the cathode side and an anode chamber on the anode side and so that the layer (C) becomes to be on the cathode side, and the layers (S) become to be on the anode side.

Advantages Effects of Invention

According to the ion exchange membrane for alkali chloride electrolysis present invention, the membrane strength is high the membrane resistance is law that it is possible to reduce electrolysis voltage during alkaline chloride electrolysis n it is possible to prevent peeling between the layers (S) and the layer (C).

According to the alkali chloride electrolysis apparatus of the present invention, it is possible to make the membrane strength of the ion exchange membrane for alkali chloride electrolysis to be high, to make peeling between the layers (S) and the layer (C) less likely to occur, and further to make the membrane resistance to be low so that it is possible to lower electrolysis voltage during alkali chloride electrolysis.

DESCRIPTION OF EMBODIMENTS

Figure 1:
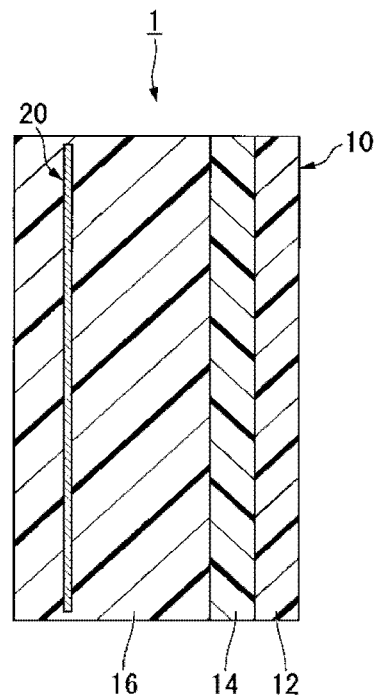
FIG. 1 is a schematic cross-sectional view showing an example of the ion exchange membrane for alkali chloride electrolysis of the present invention.

The following definitions of terms apply throughout the specification including claims.

An "ion exchange group" is a group in which at least some of ions contained in the group may be exchanged for other ions.

A "carboxylic acid functional group" means carboxylic acid group (—COOH) or COOM$^1$ (where M$^1$ is an alkali metal or a quaternary ammonium base).

A "sulfonic acid functional group" means a sulfonic acid group (—SO$_3$H) or SO$_3$M$^2$ (where M$^2$ is an alkali metal or a quaternary ammonium base).

A "group convertible to an ion exchange group" means a group that can be converted to an ion exchange group by a known treatment such as hydrolysis treatment or acid-form processing.

A "group convertible to a carboxylic acid functional group" means a group that can be converted to a carboxylic acid functional group by a known treatment such as hydrolysis treatment or acid-form processing.

A "group convertible to a sulfonic acid functional group" means a group that can be converted to a sulfonic acid functional group by a known treatment such as hydrolysis treatment or acid-form processing.

A "perfluorocarbon polymer" means a polymer wherein all of hydrogen atoms bonded to carbon atoms in the polymer, are substituted by fluorine atom. Some of fluorine atoms in the perfluorocarbon polymer may be substituted by chlorine atoms or bromine atoms.

A "monomer" means a compound having polymerization reactive carbon-carbon double bond.

A "structural unit" means a moiety derived from a monomer, which is present a polymer to constitute the polymer. As formed by addition polymerization of a monomer having a carbon-carbon unsaturated double bond, a structural unit derived from the monomer, is a divalent structural unit formed by cleavage of the unsaturated double bond. Further, one having the structure of a certain structure unit chemically inverted after polymer formation, may also be referred to as a structural unit. In the following, as the case requires, a structural unit derived from an individual monomer may be referred to by a name of the monomer name followed by "structural unit".

In the present invention, "layers (S) which comprise a fluorinated polymer having sulfonic acid functional groups" means that at least two layers including a layer (Sa) and a layer (Sb) are present, but when simply referred to by "layers (S)" such means all of such multiple layers.

A "layer (Sb)" is a single layer or a plurality of layers, but when the layer is composed of a plurality of layers, the term "layer (Sb)" refers to all of the plurality of layers.

In the present invention, a layer formed by bonding together a plurality of layers or films having the same type of functional group and the same ion exchange capacity in the production process, is regarded as one layer.

The ion exchange membrane for alkali chloride electrolysis of the present invention is an ion exchange membrane comprising a layer (C) which comprises a fluorinated polymer having carboxylic acid functional groups, at least two layers (S) which comprise a fluorinated polymer having sulfonic acid functional groups, and a reinforcing material, wherein the layer (C) and the layers (S) are laminated.

Further, in a layer (Sb) in the layers (S) as described later, a reinforcing material is disposed, and the mechanical strength and dimensional stability of the ion exchange membrane are proved by the reinforcing material.

The layers (S) have a multilayer structure composed of at least two layers. The layers (S) include a layer (Sa) and layer (Sb), and the layer (Sa) is a layer adjacent to the layer (C), while the layer (Sb) is a layer which is not adjacent to the layer (C). Of these layers (S), the layer (Sa) in contact with the layer (C) is a layer not in contact with the reinforcing material, and the layer (Sb) not in contact with the layer (C)

is a single, layer or a laminate of two or more layers. In the case where the layer (Sb) is made of a plurality of layers, when it is referred to as the layer (Sb), it means all of the plurality of layers.

The reinforcing material is disposed in said layer (Sb) substantially in parallel to the layer (Sb) in, a state no contact with said layer (Sa).

Figure 2:
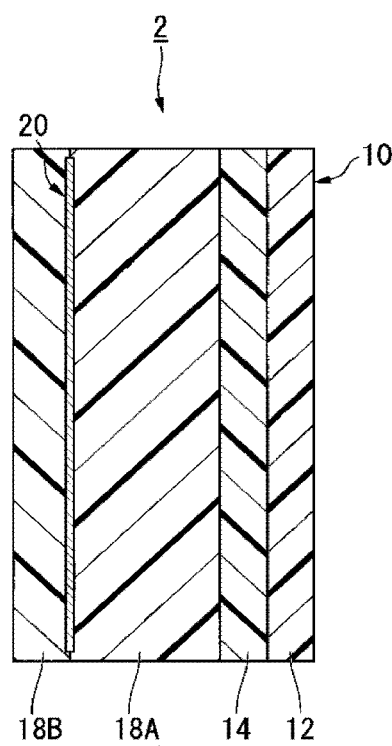
FIG. 2 is a schematic cross-sectional view showing another example of the ion exchange membrane for alkali chloride electrolysis of the present invention.

FIG. 1 and FIG. 2 are schematic cross-sectional views showing examples of the ion exchange membrane for alkali chloride electrolysis of the present invention. In the ion exchange membrane for alkali chloride electrolysis in FIG. 1 (hereinafter referred to as "ion exchange membrane 1"), a reinforcing material 20 is disposed in a layer (Sb) 16 and is not in contact with a layer (Sa) 14. Further, in the ion exchange membrane for alkali chloride electrolysis in FIG. 2 (hereinafter referred to as "ion exchange membrane 2"), a reinforcing material 20 is laminated between a layer (Sb) 18A and a layer (Sb) and is not its contact with a layer (Sa) 14. Thus, as the reinforcing material is disposed in the layer (Sb), the structure will be such that the layer (Sa) and the reinforcing material are not in contact with each other. The reinforcing material may be embedded in the layer (Sb) or may be laminated between two layers of layer (Sb).

Further, the ion exchange capacity of the layer (Sa) is lower than the ion exchange capacity of the layer (Sb).

The ion exchange membrane for alkali chloride electrolysis of the present invention has a construction in which an electrolyte membrane comprising a fluorinated polymer having ion exchange groups, is reinforced by the reinforcing material.

The electrolyte membrane has a function to exhibit high current efficiency and is a laminated membrane comprising a layer (C) made of a fluorinated polymer having carboxylic acid type functional groups, and at least two layers (S) made of a fluorinated polymer having sulfonic acid functional groups. The layers (S) comprise at least two layers including a layer (Sa) and a layer (Sb) composed of one layer or two or more layers.

The layer (Sb) may be a single layer or may be composed of two more layers.

The reinforcing material is disposed in the layer (Sb) substantially in parallel with the layer (Sb) a state not in contact with the layer (Sa) in the layers (S).

Here, in a case where the interface of layers does not exist distinctly, for example, in a case where the interface of layers is an interface where the ion exchange capacity continuously changes, a point having an intermediate value between the ion exchange capacities of the two adjacent layers is regarded as the interface of the layers.

In the ion exchange membrane of the present invention, the ion exchange capacity of the layer (Sa) being lower than the ion exchange capacity of the layer (Sb) is one of the features.

As the fluorinated polymer having carboxylic acid functional groups to form a layer (C) of the electrolyte membrane, as compared to the fluorinated polymer having sulfonic acid functional groups to form a layer (S), a polymer having a low ion exchange capacity and having also a low water content is used in many cases. In order to improve peeling resistance, it is conceivable to use, as the polymer constituting the layer (S), a polymer having a low ion exchange capacity and having also a low water content. However, if a fluorinated polymer having sulfonic acid functional groups with a low ion exchange capacity, is used, although the peeling resistance may be improved, the electrolysis voltage will be increased.

In the ion exchange membrane of the present invention, a layer (Sa) having a lower ion exchange capacity is provided to reduce the proportion of a polymer having a low ion exchange capacity, and at the same time, as the layer (Sb), a polymer having a higher ion exchange capacity is used to lower the membrane resistance.

The reinforcing material constituting the ion exchange membrane is disposed the layer (Sb) substantially in parallel to the layer (Sb) in a state not in contact with said layer (Sa). The reinforcing material may be disposed in one layer (Sb) or may be disposed as laminated between two layers (Sb). If the reinforcing material is at a position close to the layer (C), the membrane resistance is likely to be increased under the influence of the shielding. Therefore, in the ion exchange membrane of the present invention, the reinforcing material is disposed in the layer (Sb) in a state not in contact with the layer (Sa). Thus, even if the membrane resistance is lowered, the electrolysis voltage can be lowered.

It is preferred that the reinforcing material is disposed in the layer (Sb) at a position close to the ion exchange membrane surface on the opposite side to the layer (C). Here, when the location of the reinforcing a position very close to the ion exchange membrane surface, irregularities may sometimes be formed on the surface of the ion exchange membrane but even in such a case, there will be no influence to the effects of the present invention.

The thickness of the layer (Sb) located on the opposite side to the layer (C) via the reinforcing material is preferably from 10 to 60 µm, more preferably from 10 to 40 µm. When the thickness of the layer (Sb) is at least the above lower limit, the reinforcing material wilt be fit in the electrolyte membrane, and peeling resistance of the reinforcing material will be improved. Further, the reinforcing material will not be too close to the surface of the electrolyte membrane, whereby cracking is less likely to occur at the surface of the electrolyte membrane, and consequently, lowering of the mechanical strength will be prevented. On the other hand, when the thickness of the layer (Sb) is at most the above upper limit, the membrane resistance of the ion exchange membrane can be suppressed to be sufficiently low, and increase of the electrolysis voltage can be sufficiently suppressed.

The total thickness of layers (S) (i.e. the layer (Sa) and the layer (Sb)) located on the layer (C) side via the reinforcing material, is preferably from 30 to 140 µm, more preferably from 30 to 100 µm. When the total value in thickness of the layers (S) positioned in the layer (C) side via the reinforcing material is at least the above lower limit, the mechanical strength of the ion exchange membrane will be sufficiently high, and when it is at most the above upper limit value, the membrane resistance of the exchange membrane can be suppressed to be sufficiently low, and increase of the electrolysis voltage can be sufficiently suppressed.

The relative position of the reinforcing material in the layers (S) is preferably a position where a ratio of the thickness of the layer (Sb) located on the opposite side to the layer (C) via the reinforcing material, to the thickness of the layers (S), becomes to be from 0.05 to 0.6, more preferably a position where such a ratio becomes to be from 0.05 to 0.5, further preferably a position where such a ratio becomes to be from 0.05 to 0.4. When such a ratio is at least the above lower limit value of the ratio, cracking is less likely to occur at the surface of the layer (Sb), and the mechanical strength of the ion exchange membrane becomes sufficiently high, and when it is at most the upper limit value, it is possible to make the ion exchange membrane to be sufficiently thin, while suppressing the influence by the shielding, and it is possible to reduce the electrolysis voltage.

Since the layer (Sa) has a lower ion exchange capacity than the layer (Sb), its thickness is preferably made to be thin as much as possible in order to reduce the electrolysis voltage. However, in the construction of the conventional ion exchange membrane, if the layer (Sa) is made to be thin, the position of the reinforcing material becomes to be close to the layer (C), whereby the influence of the shielding will increase, and the electrolytic voltage rather tends to increase. However, according to the ion exchange membrane of the present invention, even if the layer (Sa) is a thin layer, it is possible to set the location of the reinforcing material at a position apart from the layer (C), whereby it is possible to realize a lower electrolysis voltage.

That is, in the ion exchange membrane of the present invention, the layers (S) are made to be a plurality of layers, and the ion exchange capacity of the layer (Sa) is made to be lower than that of the layer (Sb), whereby, while securing the peeling resistance, the ion exchange capacity of the layer (Sb) is made to be high, and the membrane resistance is further lowered. Further, by making the reinforcing material to be not in contact with the layer (Sa), the reinforcing material is located at a position apart from the layer (C), to reduce the influence of the shielding and to reduce the membrane resistance.

In this way, the ion exchange membrane for alkali chloride electrolysis of the present invention is an ion exchange membrane which satisfies both low electrolysis voltage and high peeling resistance which used to be in a trade-off relationship, and which, while realizing very low electrolysis voltage, has high peeling resistance.

The layer (C) is a layer which comprises a fluorinated polymer having carboxylic acid functional groups. The fluorinated polymer having carboxylic acid functional groups may, for example, be a copolymer having structural units derived from a fluorinated monomer having a carboxylic add functional group, and structural units derived from a fluoroolefin.

The fluorinated polymer having carboxylic acid functional groups is obtainable, in later-described step (b), by converting groups convertible to carboxylic acid functional groups, in a fluorinated polymer having the groups convertible to carboxylic acid functional groups, to the carboxylic acid functional groups.

The ion exchange capacity of the layer (C) is preferably from 0.5 to 2.0 meq/g dry resin, more preferably from 0.7 to 1.1 meq/g dry resin. When the ion exchange capacity of the layer (C) is at least the lower limit value, the electrical resistance of the brave tends to be low, whereby the electrolytic voltage can be made low. When the ion exchange capacity is at most the upper limit value, the synthesis of high molecular weight polymer will be easy, and it is also possible to prevent excessive swelling of the polymer.

The thickness of the layer (C) is preferably from 5 to 50 μm, more preferably from 0 to 35 μm. When the thickness of the layer (C) is at least the above lower limit value, it is easy to obtain a high current efficiency. Further, in a case where electrolysis of sodium chloride is conducted, the amount of sodium chloride in the sodium hydroxide as a product can be reduced. When the thickness of the layer (C) is at most the upper limit value, the membrane resistance of the ion exchange membrane can be suppressed to be low, and the electrolysis voltage is likely to be low.

The layers (S) are layers which comprise a fluorinated polymer having sulfonic acid functional groups, include the layer (Sa) which is adjacent to the layer (C) and a layer (Sb) not in contact with the layer (C), and comprise the layer (Se), the layer (Sb) and the reinforcing material. The layers (S) have a laminated structure in which two or more layers are laminated, namely, have a structure in which a layer (Sa) and at least one layer (Sb) are laminated.

The fluorinated polymer having sulfonic acid functional groups may, for example, be a copolymer having structural units derived from a fluorinated monomer having a sulfonic acid functional group, and structural units derived from a fluoroolefin. The fluorinated polymer having sulfonic acid functional groups may be obtained, in the step (B) to be described later, by converting groups convertible to sulfonic acid functional groups ire a fluorinated polymer having the groups convertible to sulfonic acid functional groups, to the sulfonic acid functional groups.

In the present invention, the ion exchange capacity of the layer (Sa) is lower than the ion exchange capacity of the layer (Sb). In a case where the layer (Sb) is a plurality of layers, it is preferred that rather than the ion exchange capacity of all layers (Sb) in the layer (Sb), the ion exchange capacity of all layers (Sa) is lower.

By lowering the ion exchange capacity of the layer (Sa), the difference in the amount of movement of the water between the layer (Sa) and the layer (becomes small, whereby peeling resistance will be improved. This is considered to be such that the difference in water content between the layer (Sa) and the layer (C) comes smell, whereby the difference in the amount of movement of water becomes small.

Further, by increasing the ion exchange capacity of the layer (Sb), the ion exchange capacity of the layers (S) as a whole can be maintained to be sufficiently high, whereby the membrane resistance as the entire membrane becomes sufficiently small, and it is possible to lower the electrolysis voltage during alkali chloride electrolysis.

The difference between the ion exchange capacity of the layer (Sa) and the ion exchange capacity of the layer (Sb) is preferably from 0.01 to 0.5 meq/g dry resin, more preferably from 0.03 to 0.3 meq/g dry resin. When the difference in the ion exchange capacity is at least the above lower limit value, the peeling resistance will be improved. When the difference in the ion exchange capacity is at most the above upper limit value, it is possible to maintain the ion exchange capacity of the layer (Sb) to be sufficiently high, whereby the membrane resistance as the entire membrane becomes sufficiently small, and the electrolysis voltage during alkali chloride electrolysis comes low.

The difference in ion exchange capacity between the layer (C) and the layer (Sa) is preferably at most 0.5 meq/g dry resin, more preferably at most 0.35 meq/g dry resin. When the difference in ion exchange capacity between the layer (C) and the layer (Sa) is at most the above upper limit value, peeling resistance will be improved.

Further, the difference in water content between the layer (C) and the layer (Sa) is preferably at most 15.5%, more preferably at most 13%.

When the difference in water content between the layer (C) and the layer (Sa) is at most the above upper limit value, the peeling resistance will be improved.

The ion exchange capacity of the layer (Sa) is preferably from 0.5 to 2.0 meq/g dry resin, more preferably from 0.8 to 2.0 meq/g dry resin. When the ion exchange capacity of the layer (Sa) is at least the above lower limit value, it tends to be easy to lower the membrane resistance of the ion exchange membrane, and it tends to be easy to lower the electrolysis voltage during alkali chloride electrolysis. When the ion exchange capacity of the layer (Sa) is at most the above upper limit value, peeling resistance will be improved.

The ion exchange capacity of the layer (Sb) should better be high from the viewpoint of reducing the electrolysis voltage. However, a fluorinated polymer having sulfonic acid functional groups with a high ion exchange capacity is difficult to synthesize, and the mechanical strength tends to decrease.

The ion exchange capacity of the layer (Sb) is preferably from 0.51 to 2.01 meq/g dry resin, more preferably from 0.9 to 2.01 meq/g dry resin. When the ion exchange capacity of the layer (Sb) is at least the above lower limit value, the membrane resistance of the ion exchange membrane can easily be made to be low, and the electrolysis voltage during alkali chloride electrolysis can easily be made to be low. When the ion exchange capacity of the layer (Sb) is at t the above upper limit value, the strength as a membrane can be maintained.

The ratio of the thickness of the layer (Sa) to the thickness of the layer (Sb) is preferably at most 0.4. If the layer (Sb) is thick as compared with the thickness of the layer (Sa), it is easy to lower the membrane resistance of the ion exchange membrane, and it is easy to lower the electrolysis voltage during alkali chloride electrolysis. When the layer (Sa) is thin as compared with the thickness of the layer (Sb), peeling resistance will be improved.

The lower limit value of the above ratio is preferably 0.01, more preferably 0.04. When the above ratio is at least the above lower limit value, a single-layer film formation will be easy.

The thickness of the layer (Sa) is preferably from 1 to 50 μm preferably from 1 to 40 μm. When the thickness of the layer (Sa) is at least the above lower limit value, peeling resistance will be improved. When the thickness of the layer (Sa) is t most the above upper limit value, it is easy to lower the membrane resistance, and it is easy lower the electrolysis voltage during alkali chloride electrolysis.

As the reinforcing material in the present invention, woven fabric, nonwoven fabric, fibril, porous material, etc. may be mentioned, and from the viewpoint of strength, woven fabric is preferred. The material for the reinforcing material may be a fluorinated polymer such as PTFE. The reinforcing material is disposed in the layer (Sb) substantially in parallel with the layer (Sb) in a state not in contact with the layer (Sa).

The shape of the reinforcing member is a thin membrane form, and its thickness is preferably from 60 to 150 μm, more preferably from 80 to 130 μm. Here, "disposed in the layer (Sb) substantially in parallel with the layer (Sb)" means that the reinforcing member is disposed in such a state that the distance between the reinforcing member and the surface at which the Sb layer is in contact with the Sa layer is substantially uniform in the range used in the electrolytic cell.

The method for producing an ion exchange membrane of the present invention is, for example, preferably a method of production through the following steps (a) and (b).

Step (a): a step of obtaining a precursor membrane comprising a fluorinated polymer having groups, convertible to ion exchange groups, as a reinforced precursor rave which is reinforced with a reinforcing material.

Step (b): a step of letting the reinforced precursor membrane obtained in step (a) be in contact with an alkaline aqueous solution to hydrolyze the groups convertible to ion exchange groups and convert them to ion exchange groups thereby to obtain an ion exchange membrane.

In step (a), by a co-extrusion method, a laminated membrane of a precursor layer (C') made of a fluorinated polymer having groups convertible to carboxylic acid functional groups and a precursor layer (S'a) made of a fluorinated polymer having groups convertible to sulfonic acid functional groups, is obtained.

Further, with respect to the layer (Sb), separately, by a single layer extrusion method, a precursor layer (S'b-1) and a precursor layer (S'b-2) made of a fluorinated polymer having groups convertible to sulfonic acid functional groups, are obtained.

Then, the precursor layer (S'b-2), a reinforcing material, the precursor layer (S'b-1), the precursor layer (S'a) and the precursor layer (C') are disposed in this order, and they are laminated by using laminating rolls ore vacuum laminator. At that time, the laminated membrane of the precursor layer (S'a) and the precursor layer (C') is disposed so that the precursor layer (S'a) is in contact with the precursor layer (S'b-1).

The precursor layer (S'a) will become a layer (Sa) after the groups convertible to ion exchange groups are converted to the ion exchange groups in step (b).

The layer having the precursor layer (S'b-1) and the precursor layer (S'b-2) bonded, will become a layer (Sb) after the groups convertible to ion exchange groups are converted to the ion exchange groups in step (b). Here, in a case where the ion exchange capacities after hydrolysis treatment of the precursor layer (S'b-1) and the precursor layer (S'b-2) are the same, the layer (Sb) becomes a single-layer, and if different, layer (Sb) becomes two layers.

Another method may be a method wherein by a layer extrusion method, a laminated membrane of the precursor (C'), the precursor (Sa) and the precursor (S'b-1) is obtained separately, by a single layer extrusion method, the precursor layer (S'b-2) is obtained, and then, these and, a reinforcing material are laminated.

In step (a), the fluorinated polymer having groups convertible carboxylic acid functional groups may, for example, be a copolymer having structural units derived from a fluorinated monomer having a group convertible to a carboxylic acid functional group, and structural units derived from a fluorinated olefin.

The fluorinated monomer having a group convertible to a carboxylic acid functional group, is not particularly limited so long as it is a compound having one or more fluorine atoms in the molecule, having an ethylenic double bond and having a group convertible to a carboxylic acid functional group, and it is possible to use a conventionally known one.

As the above fluorinated monomer, a monomer represented by the following formula (1) is preferred form the viewpoint of the production cost monomer, reactivity with other monomers, excellent properties of the obtainable fluorinated polymer, etc.

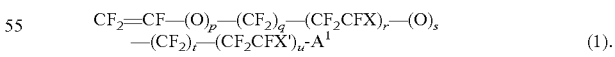

$$CF_2=CF-(O)_p-(CF_2)_q-(CF_2CFX)_r-(O)_s-(CF_2)_t-(CF_2CFX')_u-A^1 \quad (1).$$

X in the formula (1) is a fluorine atom or a trifluoromethyl group. Further, X' is a fluorine atom or a trifluoromethyl group. In a case where both X and X' are present in one molecule, or two or more X or X' are present, they may be the same or may be different.

$A^1$ is a group convertible to a carboxylic acid functional group, and a functional group convertible to a carboxylic acid functional group by hydrolysis. The functional group convertible to a carboxylic acid functional group may, for example, be —CN, —COF, —COOR$^1$ (where R$^1$ is an alkyl group having from 1 to 10 carbon atoms)

—COONR$^2$R$^3$ (where R$^2$ and R$^3$ are each a hydrogen atom or an alkyl group having from 1 to 10 carbon atoms and R$^2$ and R$^3$ may be the same or may be different), etc.

p is 0 or 1, q is an integer of from 0 to 12, r is an integer of from 0 to 3, s is 0 or 1, t is an integer of from 0 to 12, and u is an integer of from 0 to 3. However, p and s are not 0 at the same time, and r and u are not 0 at the same tithe. In other words, 1≤p+s, and 1≤r+u.

Specific examples of the monomer represented by the formula (1) include the following compounds. From the viewpoint of easy production compounds wherein p=1, q=0, r=1, s=0 to 1, t=1 to 3, u=0 to 1, are preferred.

CF$_2$=CF—O—CF$_2$CF$_2$—COOCH$_3$,

CF$_2$=CF—O—CF$_2$CF$_2$—CF$_2$—COOCH$_3$,

CF$_2$=CF—O—CF$_2$CF$_2$—CF$_2$CF$_2$—COOCH$_3$,

CF$_2$=CF—O—CF$_2$CF$_2$—O—CF$_2$CF$_2$—COOCH$_3$,

CF$_2$=CF—O—CF$_2$CF$_2$—O—CF$_2$CF$_2$—CF$_2$—COOCH$_3$,

CF$_2$=CF—O—CF$_2$CF$_2$—O—CF$_2$CF$_2$—CF$_2$CF$_2$—COOCH$_3$,

CF$_2$=CF—O—CF$_2$—CF$_2$CF$_2$—O—CF$_2$CF$_2$—COOCH$_3$,

CF$_2$=CF—O—CF$_2$CF(CF$_3$)—O—CF$_2$CF$_2$—COOCH$_3$,

CF$_2$=CF—O—CF$_2$CF(CF$_3$)—O—CF$_2$—CF$_2$CF$_2$—COOCH$_2$.

As the fluorinated monomer having a group convertible to a carboxylic acid functional group, one type may be used alone or two or more types may be used in combination.

The fluorinated olefin may, for example, be a C$_{2-3}$ fluoroolefin having one or more fluorine atoms in the molecule. As the fluoroolefin, tetrafluoroethylene (CF$_2$=CF$_2$) (hereinafter referred to as TFE), chlorotrifluoroethylene (CF$_2$=CFCl), vinylidene fluoride (CF$_2$=CH$_2$), vinyl fluoride (CH$_2$=CHF), hexafluoropropylene (CF$_2$=CFCF$_3$), etc. may be mentioned. Among them, TFE is particularly preferred from the viewpoint of the production cost of the monomer, reactivity with other monomers, excellent properties of the obtainable fluorinated polymer.

As the fluorinated olefin, one type may be used alone, or two or more types may be used in combination.

In the present invention, for the fluorinated polymer to form a layer (C), in addition to the fluorinated monomer having a group convertible to a carboxylic acid functional group and the fluorinated olefin, other monomers may also be used. Other monomers may, for example, be CF$_2$=CF—R$^f$ (where R$^f$ is a perfluoroalkyl group having from 2 to 10 carbon atoms), CF$_2$=CF—OR$^{f1}$ (where R$^{f1}$ is a perfluoroalkyl group having from 1 to 10 carbon atoms) CF$_2$=CFO(CF$_2$)$_v$CF=CF$_2$ (where v is an integer of from 1 to 3), etc. By copolymerizing other monomers, it is possible to improve flexibility or mechanical strength of the ion exchange membrane.

The proportion of such other monomer is, from the viewpoint of maintaining the ion exchange performance, preferably at most 30 mass %, especially preferably from 5 to 25 mass %, in all monomers (100 mass %). Further, the proportion of such other monomer is preferably at most 30 mol %, especially preferably from 5 to 20 mol %, in all structural units (100 mol %) in the fluorinated polymer.

The molecular weight of the fluorinated polymer having groups convertible to carboxylic acid functional groups, is, as the TQ value, preferably at least 150° C., more preferably from 170 to 340° C., further preferably from 170 to 300° C., in view of mechanical strength and film-forming ability as an for exchange membrane.

In the above step (a), the fluorinated polymer having groups convertible to sulfonic acid functional groups may, for example, be a copolymer having structural units derived from fluorinated monomer having a group convertible to a sulfonic acid functional group, and structural units derived from a fluorinated olefin.

The above fluorinated monomer is not particularly limited so long as it is a compound having one or more fluorine atoms in the molecule, having a ethylenic double bond and having a group convertible to a sulfonic acid functional group, and possible to use a conventionally known one.

The fluorinated monomer having a group convertible to a sulfonic acid functional group is preferably a compound represented by the following formula (2) or a compound represented by the following formula (3) from the viewpoint of the production cost of the monomer, reactivity with other monomers, excellent properties of the obtainable fluoropolymer.

$$CF_2=CF—O—R^{f2}-A^2 \quad (2),$$

$$CF_2=CF—R^{f2}-A^2 \quad (3).$$

R$^{f2}$ is a perfluoroalkylene group having from 1 to 20 carbon atoms, which may contain an etheric oxygen atom, and which may be linear or branched.

A$^2$ is a group convertible to a sulfonic acid functional group. The group convertible to a sulfonic acid functional group is a functional group convertible to a sulfonic acid functional group by hydrolysis. The functional group convertible to a sulfonic acid functional group may, for example, be —SO$_2$F, —SO$_2$Cl, —SO$_2$Br, etc.

As the compound represent by formula (2), specifically, the following compounds are preferred.

CF$_2$=CF—O—(CF$_2$)$_a$—SO$_2$F (where a is an integer of from 1 to 8),

CF$_2$=CF—O—CF$_2$CF(CF$_3$)O(CF$_2$)$_a$—SO$_2$F (where a is an integer of from 1 to 8), CF$_2$=CF[OCF$_2$CF(CF$_3$)]$_a$SO$_2$F (where a is an integer of from 1 to 5).

As the compound represented by formula (3), specifically, the following compounds are preferred, CF$_2$=CF(CF$_2$)$_b$—SO$_2$F (where b is an integer of from 1 to 8), CF$_2$=CF$_2$—O—(CF$_2$)$_b$—SO$_2$F (where b is an integer of from 1 to 8).

As the fluorinated monomer having a group convertible to a sulfonic acid functional group, the following compounds are more preferred from such a viewpoint that industrial synthesis is easy.

CF$_2$=CFOCF$_2$CF$_2$S)$_2$F,

CF$_2$=CFOCF$_2$CF$_2$CF$_2$SO$_2$F,

CF$_2$=CFOCFCF$_2$CF$_2$CF$_2$SO$_2$F,

CF$_2$=CFOCF$_2$CF(CF$_3$)OCF$_2$CF$_2$SO$_2$F,

CF$_2$=CFOCF$_2$CF(C F$_3$)OCF$_2$CF$_2$CF$_2$SO$_2$F,

CF$_2$=CFOCF$_2$CF(CF$_3$)SO$_2$F,

CF$_2$=CFCF$_2$CF$_2$SO$_2$F,

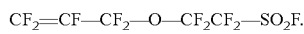

As the fluorinated monomer having a group convertible to a sulfonic acid is functional group, one type may be used alone, or two or more types may be used in combination.

As the fluorinated olefin, those exemplified above may be mentioned, and TFE is particularly preferred from the viewpoint of the production cost of the monomer, reactivity with other monomers, excellent properties of the obtainable fluorinated polymer.

As the fluorinated olefin, one type may be used alone, or two or more types may be used in combination.

In the present invention, for the fluorinated polymer to form layers (S), in addition to the fluorinated monomer having a group convertible to a sulfonic acid functional group and the fluorinated olefin, other monomers may further be used. Other monomers may be those exemplified above. By copolymerizing such other monomer it is possible to improve flexibility and mechanical strength of the ion exchange membrane. The proportion of such other monomer is, from the viewpoint of maintaining the ion exchange performance, preferably at most 30 mass %, especially preferably from 5 to 25 mass %, in all monomers (100 mass %). The proportion of such other monomer is preferably at most 30 mol %, especially preferably from 5 to 25 mol % in all structural units (100 mol %) in the fluoropolymer.

The molecular weight of, the fluorinated polymer having groups convertible to sulfonic acid functional groups, is, as the TQ value, preferably at least 150° C., more preferably from 170 to 340° C., further preferably from 170 to 300° C., in view of mechanical strength and film-forming ability as an ion exchange membrane.

In the step (b), by hydrolyzing groups convertible carboxylic acid functional groups and groups convertible to sulfonic acid functional groups, in the reinforced precursor membrane obtained in step (a), to convert them respectively to carboxylic acid functional groups and sulfonic acid functional groups, an ion exchange membrane can be obtained.

The method for hydrolysis is, for example, preferably a method of using a mixture of a water-soluble organic compound and a hydroxide of an alkali metal, as disclosed in JP-A-1-140987.

Figure 3:
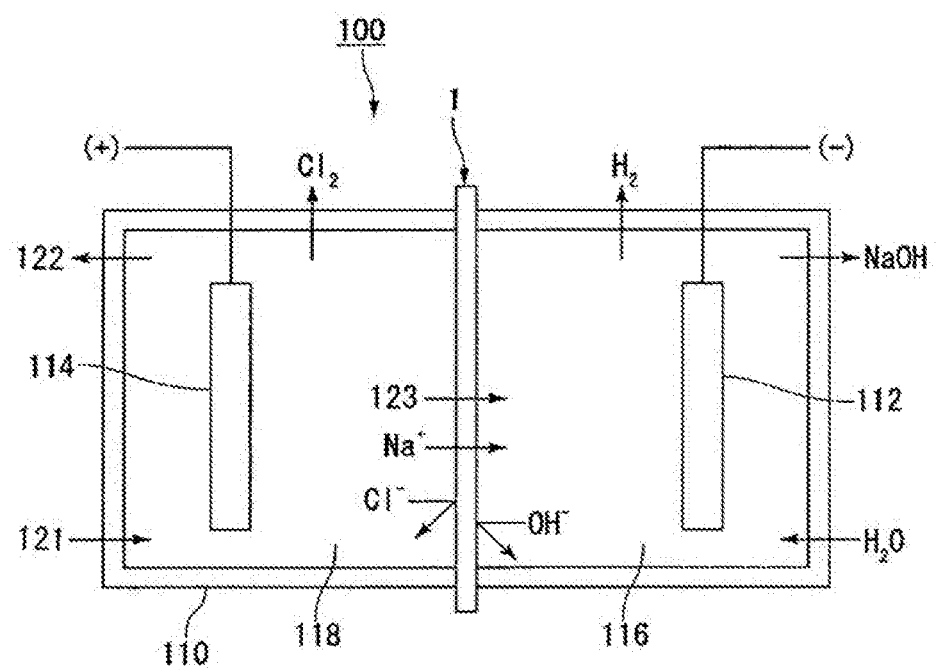
FIG. 3 is a schematic diagram showing an example of the alkali chloride electrolysis apparatus of the present invention.

For the alkali chloride electrolysis apparatus of the present invention, a known mode may be employed, except that the ion exchange membrane for alkali chloride electrolysis of the present invention is used. FIG. 3 is a schematic diagram showing an example of the alkali chloride electrolysis apparatus of the present invention.

The alkali chloride electrolysis apparatus 100 comprises an electrolytic cell 110 provided with a cathode 112 and an anode 114, and an ion exchange membrane 1 which is mounted in the electrolytic cell 110 so as to partition inside of the electrolytic cell 110 into a cathode chamber 116 and an anode chamber 118.

The Ion exchange membrane 1 is mounted in the electrolytic cell 110 so that the layer (C) 12 be on the cathode 112 side, and the layer (Sb) 16 be on the anode 114 side.

The cathode 112 may be disposed in contact with the ion exchange membrane 1, or it may be disposed as spaced from the ion exchange membrane 1.

As the material constituting the cathode chamber 116, a material which is resistant to sodium hydroxide and hydrogen is preferred. As such a material, stainless steel, nickel, etc. may be mentioned.

As the material constituting the anode chamber 118, a material which is resistant to sodium chloride and chlorine is preferred. As such a material, titanium may be mentioned.

As the material for the cathode, stainless steel or nickel is used as a preferred substrate, and a Ni—S alloy, Raney Ni, NiO, a Ni—Sn alloy, a platinum group element such as Pt or Ru is used as the electrode catalyst layer. As the material for the anode, preferably used is titanium or the like having an oxide coating layer.

For example, in the case of producing an aqueous sodium hydroxide solution by electrolysis of an aqueous sodium chloride solution, by supplying the aqueous sodium chloride solution to the anode chamber 118 of the alkali chloride electrolysis apparatus 100, supplying the aqueous sodium hydroxide solution to the cathode chamber 116, and while maintaining the concentration of the aqueous sodium hydroxide solution discharged from the cathode chamber 116 at a predetermined concentration (e.g. 32 mass %), the aqueous sodium chloride solution is electrolyzed.

In the alkali chloride electrolysis apparatus of the present invention, the membrane strength of the ion exchange membrane for alkali chloride electrolysis is high, peeling between the layer (Sa) and the layer (C) is less likely to be caused, and further the membrane resistance is low and the electrolysis voltage during alkali chloride electrolysis is low.

EXAMPLES

Now, the present invention will be specifically described with reference to Examples, but the present invention is by no means limited by the following Examples. Ex. 1 to 3, 10 and 12 are Examples of the present invention, and Ex, 4 to 9, 1 and 13 are Comparative Examples.

(Measurement of TQ Value)

The TQ value is a value related to the molecular weight of a polymer and was obtained as a temperature showing a volume flow rate of 100 mm$^3$/sec. The volume flow rate was set to be a volume flow rate (unit: mm$^3$/sec.) at the time when a fluorinated polymer having groups convertible to ion exchange groups was melted and permitted to flow out through an orifice (diameter: 1 mm, length: 1 mm) under a pressure of 3 MPa, by using Shimadzu Flow Tester CFD-100D (manufactured by Shimadzu Corporation).

(Measurement of Ion Exchange Capacity)

About 0.5 g of a fluorinated polymer having groups convertible to ion exchange groups, was flat-pressed into a film at a temperature higher by about 10° C. than its TQ value, and the obtained film sample was analyzed by a transmission infrared spectroscopy apparatus. By using the respective peak heights of the CF$_2$ peak, CH$_3$ peak, OH peak, CF peak and SO$_2$F peak of the obtained spectrum, the proportions of structural units having groups convertible to carboxylic acid functional groups or groups convertible to sulfonic acid functional groups were calculated and by adopting them as proportions of structural units having carboxylic acid functional groups or sulfonic acid functional groups in a fluorinated polymer obtainable after hydrolysis treatment, and using samples with known ion exchange capacities as a calibration curve, the ion exchange capacity was obtained.

(Measurement of Water Content)

A fluorinated polymer was extruded alone to obtain a film having a thickness of 100 μm. The obtained film was hydrolyzed by dipping in an aqueous solution containing dimethyl sulfoxide (DMSO) and potassium hydroxide (KOH). The film after hydrolysis, was immersed in an aqueous sodium hydroxide solution, to obtain an ion exchange membrane of a single layer with counterions being Na ions. The mass ($M_1$) of this ion exchange membrane was measured, followed by washing with water and drying, end the mass ($M_2$) after drying was measured.

By the following formula, the water dents (unit: %) of the layer (C1) and the layer (S2) were calculated.

(Water content)=$[(M_1-M_2)/M_1]\times 100$ (Measurements of Electrolysis Voltage and Current Efficiency)

An ion exchange membrane was disposed in a test electrolytic cell with an effective current-carrying area of 1.5 dm$^2$ (electrolytic surface size: vertical 150 mm×horizontal 100 mm) so that the layer (C) was to face the cathode, and by using, as the anode, a punched metal (short diameter: 4 mm, long diameter: 8 mm) of titanium as coated with a solid solution of ruthenium oxide, iridium oxide and titanium oxide, and using, as the cathode, a punched metal (short diameter: 5 mm long diameter: 10 mm) made of SUS304 having ruthenium-containing Raney Nickel electrodeposited thereon, they were installed so that the electrodes and the membrane were directly in contact so as not to leave a gap.

While controlling the sodium hydroxide concentration discharged from the cathode chamber to be 32 mass %, and the sodium chloride concentration supplied to the anode chamber to be 200 g/L, the electrolysis of an aqueous sodium chloride solution, was conducted under conditions of a temperature of 90° C., and a current density of 6 kA/m$^2$, by the electrolysis voltage (V) and current efficiency (%) after 3 to 10 days from start of operation were measured.

(Evaluation of Peeling Resistance)

An ion exchange membrane was disposed in the same test electrolytic cell as described above so that the layer (C) faced the cathode. Further, within a range of the vertical 50 mm×horizontal 100 mm at an upper portion of the electrolytic surface in the anode chamber, a Ti plate was disposed so as to be spaced by 2.5 mm from the electrode surface outside of the anode. Thus, in such a state that a site where chlorine gas may stay, was formed between the Ti plate and the anode, electrolysis of an aqueous sodium chloride solution was conducted for three days under such conditions that the concentration of sodium hydroxide discharged from the cathode chamber was 32 mass %, the concentration of sodium chloride supplied to the anode chamber was 200 g/L, the temperature was 90° C. and the current was 120 A. After the three days of electrolysis, to the length d1 (mm) in the width direction of a portion of 50 mm from the top of the electrolytic surface of the removed ion exchange membrane the ratio P (%) of the sum d2 (mm) of the lengths of the peeled surface in said portion was calculated from the following equation.

$P = d2/d1 \times 100$

The smaller the value of P, the better the peeling resistance, and the larger the value of P, the lower the peeling resistance.

[Ex 1]

TFE and a fluorinated monomer having a group convertible to a carboxylic acid functional group, represented by the following formula (1-1), were copolymerized to prepare a fluorinated polymer having groups convertible to carboxylic acid functional groups (ion exchange capacity after hydrolysis treatment: 1.06 meq/g dry resin, TQ: 225° C.) (hereinafter referred to as polymer C1).

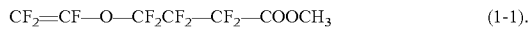

TFE and a fluorinated monomer having a group convertible to a sulfonic acid functional group, represented by the following formula (2-1), were copolymerized to prepare a fluorinated polymer having groups convertible to sulfonic acid functional groups (ion exchange capacity after hydrolysis treatment 1.00 meq/g dry resin, TQ: 235) (hereinafter referred to as polymer S1).

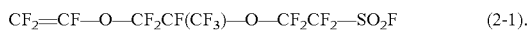

Similarly, TFE and a fluorinated monomer having a group convertible to a sulfonic acid functional group represented by the formula (2-1), were copolymerized to prepare a fluorinated polymer having groups convertible to sulfonic acid functional groups (ion exchange capacity after hydrolysis treatment 1.13 meq/g dry resin, TQ: 225) (hereinafter referred to as polymer S2).

Polymer C1 and polymer S1 were molded by a coextrusion method to obtain a film A having a two-layer structure of a precursor layer (C1') (thickness: 12 μm) made of polymer C1 and a precursor layer (S'1) (thickness: 24 μm) made of polymer S1.

Further, polymer S2 was molded by a melt extrusion method to obtain a film B (thickness: 44 μm) to become a precursor layer (S'2-1) and a film C (thickness: 30 μm), to become a precursor layer (S'2-2).

A PTFE yarn being a monofilament obtained by rapidly stretching a PTFE film, followed by slitting it to a thickness 100 denier, and a PET yarn being a multifilament of denier obtained by stretch-assembling and twisting six PET filaments of 5 denier, were plain-woven in an alternating array of one PTFE yarn and two PET yarns, to obtain a reinforcing material (woven cloth, density of PTFE yarns: 27 lines/inch, density of PET yarns: 53 lines/inch).

The film C, the reinforcing material, the film B, the film A and a release PET film (thickness: 100 μm) were overlaid in this order so that the precursor layer (C1') of the film A was located on the release PET film side, and laminated by using a roll. The release PET film was peeled off to obtain a reinforced precursor membrane.

A paste comprising 29.0 mass % of zirconium oxide (average particle diameter: 1 μm), 1.3 mass % of methyl cellulose 4.6 mass % of cyclohexanol, 1.5 mass % of cyclohexane and 63.6 mass % of water, was transferred by a roll press on the upper side of the precursor layer (S'2-2) of the reinforced precursor membrane, to form a gas releasing coating layer. The attached amount of zirconium oxide was 20 g/m$^2$.

The reinforced precursor membrane having the gas releasing coating layer formed on one side, was immersed in an aqueous solution containing 5 mass % of dimethyl sulfoxide and 30 mass % of potassium hydroxide at 95 for 8 minutes. Thus, —COOCH$_3$ of polymer C1 and —SO$_2$F of polymers S1 and S2 were hydrolyzed and converted to ion exchange groups, to obtain a membrane having, the precursor layer (C1') converted to a layer (C1), the precursor layer (S'1) converted to a layer (S1) being a layer (Sa), and the precursor layer (S'2-1) and precursor layer (S'2-2) converted to layers (S2) being layers (Sb). The water content of the layer (C1) was 11.8%, and the water content of the layer (S1) was 22.5%.

In are ethanol solution containing 2.5 mass % of an acid-form polymer of polymer S2, zirconium oxide (average particle diameter: 1 μm) was dispersed at a concentration of 13 mass % to prepare a dispersion. The dispersion was sprayed on the layer (C1) side of the membrane, to form a gas releasing coating layer, thereby to obtain an ion exchange membrane having gas releasing coating layers formed on both surfaces. The attached amount of zirconium oxide was 3 g/cm$^2$.

With respect to the obtained ion exchange membrane, evaluations were carried out, and the results are shown in Table 1.

[Ex. 2]

TFE and a fluorinated monomer having a group convertible to a sulfonic acid functional group represented by the formula (2-1) were copolymerized to prepare a fluorinated polymer having groups convertible to sulfonic acid function groups (ion exchange capacity after hydrolysis treatment: 1.10 meq/g dry resin, TQ: 225) (hereinafter referred to as polymer S3).

The polymer S3 was molded by a melt-extrusion method, to obtain a film D (thickness: 44 μm) to become a precursor layer (S'2-1) and a film E (thickness: 30 μm) to become a precursor layer (S'2-2).

An ion exchange membrane was obtained in the same manner as in Ex. 1 except for using the film D in place of the film B, and using the film E in place of the film C. With respect to the obtained ion exchange membrane, evaluations were carried out, and the results are shown in Table 1.

[Ex. 3]

An ion exchange membrane was obtained in the same manner as n Ex. 1 except for using the film D in place of the film B. With respect to the obtained ion exchange membrane, evaluations were carried out, and the results are shown in Table 1.

[Ex. 4]

Polymer C1 and polymer S2 were molded by a coextrusion method to obtain a film F having a two-layer structure of a precursor layer (C1') (thickness: 12 μm) made of polymer C1 and a precursor layer (S'1) (thickness: 68 μm) made of polymer S2. Further, in the same manner as in Ex. 1, a film C and a reinforcing material were obtained.

The film C, the reinforcing material, the film F and a release PET film (thickness: 100 μm) were overlaid in this order so that the precursor layer (C1') of the film F was located on the release PET film side and laminated by using a roll. The release PET film was peeled off to obtain a reinforced precursor membrane. An ion exchange membrane was obtained in the same manner as in Ex. 1 except for using the reinforced precursor membrane. The water content of the layer (S1) was 29.3%. With respect to the obtained ion exchange membrane, evaluations were carried out, and the results shown in Table 1.

[Ex. 5]

Polymer C1 and polymer S3 were molded by a coextrusion method to obtain a film G having a two-layer structure of a precursor layer (C1') (thickness: 12 μm) made of polymer C1 and a precursor layer (S'1) (thickness: 68 μm) made of polymer S3. Further, in the same manner as in Ex. 1, a film C and a reinforcing material were obtained.

The film C, the reinforcing material, the film G and a release PET film (thickness: 100 μm) were overlaid in this order so that the precursor layer (C1') of the film G was located on the release PET film side and laminated by using a roll. The release PET film was peeled off to obtain a reinforced precursor membrane. An ion exchange membrane was obtained in the same manner as in Ex. 1 except for using the reinforced precursor membrane. The water content of the layer (S1) was 27.5%. With respect to the obtained ion exchange membrane, evaluations were carried out, and the results are shown in Table 1.

[Ex. 6]

In the same manner as Ex. 1, a reinforcing material was obtained. In the same manner as in Ex. 2, a film E was obtained. In the same manner as in Ex. 4, a film G was obtained.

The film E, the reinforcing material, the film G and a release PET film (thickness: 100 μm) were overlaid in this order so that the precursor layer (C1') of the film G was located on the release PET film side, and laminated by using a roll. The release PET film was peeled off to obtain a reinforced precursor membrane. A ion exchange membrane was obtained in the same manner as in Ex. 1 except for using the reinforced precursor membrane. With respect to the obtained ion exchange membrane, evaluations were carried out, and the results are shown in Table 1.

[Ex. 7]

Polymer C1 and polymer S1 were molded by a coextrusion method to obtain a film H having a two layer structure of a precursor layer (C1') (thickness: 12 μm) made of polymer C1 and a precursor layer (S'1) (thickness: 68 μm) of polymer S1. In the same manner as in Ex. 1, a reinforcing material and a film C were obtained.

The film C, the reinforcing material, the film H and a release PET film (thickness: 100 μm) were overlaid in this order so that the precursor layer (C1') of the film H was located on the release PET film side, and laminated by using a roll. The release PET film was peeled off to obtain a reinforced precursor membrane. An ion exchange membrane was obtained in the same manner as in Ex. 1 except for using the reinforced precursor membrane. With respect to the obtained ion exchange membrane, evaluations were carried out, and the results are shown in Table 1.

[Ex. 8]

In the same manner as Ex. 1, a reinforcing material was obtained. In the same manner as in Ex. 2, a film E was obtained. In the same manner as in Ex. 7, a film H was obtained.

The film E, the reinforcing material, the film H and a release PET film (thickness: 100 μm) were overlaid in this order so that the precursor layer (C1') of the film H was located on the release PET film side, and laminated by using a roll. The release PET film was peeled off to obtain a reinforced precursor membrane. An ion exchange membrane was obtained in the same manner as in Ex. 1 except for using the reinforced precursor membrane. With respect to the obtained ion exchange membrane, evaluations were carried out, and the results are shown in Table 1.

[Ex. 9]

Polymer S1 was molded by a melt extrusion method to obtain a film I (thickness: 30 μm) to become a precursor layer (S'). In the same manner as in Ex. 1, a reinforcing material was obtained. In the same manner as in Ex. 7, a film H was obtained.

The film I, the reinforcing, material, the film H and a release PET film (thickness: 100 μm) were overlaid in this order so that the precursor layer (C1') of the film H was located on the release PET film side, and laminated by using a roll. The release PET film was peeled off to obtain a reinforced precursor membrane. An ion exchange membrane was obtained in the same manner Ex. 1 except for using the reinforced precursors membrane. With respect to the obtained ion exchange membrane, evaluations were carried out, and the results are shown in Table 1.

[Ex. 10]

TFE and a fluorinated monomer having a group convertible to a carboxylic acid functional group represented by the following formula (1-1), were copolymerized to prepare a fluorinated polymer having groups convertible to carboxylic acid functional groups (ion exchange capacity after, hydrolysis treatment: 1.00 meq/g dry resin TQ: 240) (hereinafter referred to as polymer C2).

Polymer C2 and polymer S1 were molded by a coextrusion method to obtain a film J having a two-layer structure of a precursor layer (C2') (thickness: 17 μm) made of polymer C2 and a precursor layer (S'1) (thickness: 20 μm) made of polymer S1.

An ion exchange membrane was obtained in the same manner as in Ex. 2 except for using the film J in place of the film A. The water content of the layer (C1) was 10.6%. With respect to the obtained ion exchange membrane evaluations were carried out, and the results are shown in Table 1.

[Ex. 13]

Polymer C3 and polymer S1 were molded by a coextrusion method to obtain a film M having a two-layer structure of a precursor layer (C3') (thickness: 17 μm) made of polymer C3 and a precursor layer (S'1) (thickness: 70 μm) made of polymer S1.

An ion exchange membrane was obtained in the same manner as in Ex. 8 except for using the film M in place of the film H. With respect to the obtained ion exchange membrane, evaluations were carried out, and the results are shown in Table 1.

TABLE 1

| | Layer (Sb) | | | | Layer (Sa) (Layer corresponding to layer (S) 14 in FIG. 2. | | Layer (C) | | | | |
|---|---|---|---|---|---|---|---|---|---|---|---|
| | Layer corresponding to layer (S) 16 in FIG. 1 or layer (S) 18B in FIG. 2 | | Layer corresponding to layer (S) 16 in FIG. 1 or layer (S) 18A in FIG. 2 | | | | | | | | |
| | Ion exchange capacity [meq/g dry resin] | Thickness of precursor [μm] | Ion exchange capacity [meq/g dry resin] | Thickness of precursor [μm] | Ion exchange capacity [meq/g dry resin] | Thickness of precursor [μm] | Ion exchange capacity [meq/g dry resin] | Thickness of precursor [μm] | Current efficiency [%] | Electrolysis voltage [V] | Ratio P [%] |
| Ex. 1 | 1.13 | 30 | 1.13 | 44 | 1.00 | 24 | 1.06 | 12 | 96.5 | 3.09 | 27 |
| Ex. 2 | 1.10 | 30 | 1.10 | 44 | 1.00 | 24 | 1.06 | 12 | 96.5 | 3.10 | 25 |
| Ex. 3 | 1.13 | 30 | 1.10 | 44 | 1.00 | 24 | 1.06 | 12 | 96.5 | 3.09 | 25 |
| Ex. 4 | 1.13 | 30 | — | — | 1.13 | 68 | 1.06 | 12 | 96.5 | 3.09 | 83 |
| Ex. 5 | 1.13 | 30 | — | — | 1.10 | 68 | 1.06 | 12 | 96.5 | 3.09 | 86 |
| Ex. 6 | 1.10 | 30 | — | — | 1.10 | 68 | 1.06 | 12 | 96.5 | 3.10 | 82 |
| Ex. 7 | 1.13 | 30 | — | — | 1.00 | 68 | 1.06 | 12 | 96.5 | 3.11 | 25 |
| Ex. 8 | 1.10 | 30 | — | — | 1.00 | 68 | 1.06 | 12 | 96.5 | 3.12 | 27 |
| Ex. 9 | 1.00 | 30 | — | — | 1.00 | 68 | 1.06 | 12 | 96.5 | 3.12 | 25 |
| Ex. 10 | 1.10 | 30 | 1.10 | 44 | 1.00 | 20 | 1.00 | 17 | 96.5 | 3.12 | 26 |
| Ex. 11 | 1.10 | 30 | — | — | 1.00 | 70 | 1.00 | 17 | 96.5 | 3.14 | 25 |
| Ex. 12 | 1.10 | 30 | 1.10 | 44 | 1.00 | 20 | 0.95 | 17 | 96.5 | 3.14 | 27 |
| Ex. 13 | 1.10 | 30 | — | — | 1.00 | 70 | 0.95 | 17 | 96.5 | 3.16 | 24 |

[Ex. 11]

Polymer C2 and polymer S1 were molded by a coextrusion method to obtain a film K having a two-layer structure of a precursor layer (C2') thickness: 17 μm) made of polymer C2 and a precursor layer (S'1) (thickness: 70 μm) made of polymer S1.

An ion exchange membrane was obtained in the same manner as in Ex. 8 except for using the film K in place of the film H. With respect to the obtained ion exchange membrane, evaluations were carried out, and the results are shown in Table 1.

[Ex. 12]

TFE and a fluorinated monomer having a group convertible to a carboxylic acid functional group represented by the following formula (1-1), were copolymerized to prepare a fluorinated polymer having groups convertible to carboxylic acid functional groups (ion exchange capacity after hydrolysis treatment: 0.95 meq/g dry resin, TQ: 245° C.) (hereinafter referred to as polymer C3).

Polymer C3 and polymer S1 were molded by a coextrusion method to obtain a film L having a two-layer structure of a precursor layer (C3') (thickness: 17 μm) made of polymer C3 and a precursor layer (S'1) (thickness: 20 μm) made of polymer S1.

An ion exchange membrane was obtained in the same manner as in Ex. 2 except for using the film L in place of the film A. The water content of the layer (C1) was 9.5%. With respect to the obtained ion exchange membrane evaluations were carried out, and the results are shown in Table 1.

Here, in Table, "–" indicates that the material was not used.

As shown in Table 1, by the ion exchange membranes in Ex. 1, 2 and 3 of the present invention, sufficient current efficiency was obtained, the electrolysis voltage was low, and the peeling resistance was excellent.

On the other hand, by the ion exchange membranes in Ex. 4 to 6 different from the membrane structure of the present invention, the peeling resistance was insufficient. Similarly, by the ion exchange membranes in Ex. 7 to 9 different from the membrane structure of the present invention, the electrolysis voltage was high as compared with the ion exchange membranes in Ex. 1, 2 and 3.

Further, by the ion exchange membranes in Ex. 10 and 12 of the present invention, as compared with Ex. 11 and 13, respectively, different from the membrane structure of the present invention, the electrolysis voltage was low, although the peeling resistance was the same. By the ion exchange membranes in Ex. 10 and 12, although the absolute value of the electrolysis voltage was high, the electrolysis voltage was substantially lower than in Ex. 11 and 13 wherein a polymer with a comparable ionic exchange capacity was used, and thus, it was found that the effects of the membrane structure of the present invention were large.

It should be noted that, even if difference between the electrolysis voltage is 0.01V, the difference in cost in the case of actually performing industrial electrolysis is very large, and the difference of 0.01V is a very big difference from the industrial point of view.

INDUSTRIAL APPLICABILITY

The electrolysis apparatus having the ion exchange membrane for alkali chloride electrolysis of the present invention is widely useful for the production of chlorine and sodium hydroxide or potassium hydroxide by electrolysis of e.g. an industrial aqueous sodium chloride solution or aqueous potassium chloride solution.

This application is a continuation of PCT Application No. PCT/JP2015/081377, filed on Nov. 6, 2015, which is based upon and claims the benefit of priority from Japanese Patent Application No. 2014-227273 filed on Nov. 7, 2014. The contents of those applications are incorporated herein by reference in their entireties.

REFERENCE SYMBOLS

1, 2: ion exchange membrane for alkali chloride electrolysis, 10: electrolyte membrane, 12: layer (C), 14: layer (Sa), 16: layer (Sb), 18A: layer (Sb), 18B: layer Sb), 20: reinforcing material, 100: alkali chloride electrolysis apparatus, 110: electrolytic cell, 112: cathode, 114: anode, 116: cathode chamber, 118: anode chamber, 121: NaCl aqueous solution, 122: dilute NaCl aqueous solution, 123: electrodialysis water

What is claimed is:

1. An ion exchange membrane, comprising, in an order from one surface to the other surface:
   a layer (C);
   a layer (Sa);
   a layer (Sb-1);
   a reinforcing material; and
   a layer (Sb-2),
   wherein the layer (C) comprises a fluorinated polymer having at least one carboxylic acid functional group,
   each of the layer (Sa), the layer (Sb-1), and the layer (Sb-2) independently comprises a fluorinated polymer having at least one sulfonic acid functional group,
   the reinforcing material is completely disposed between the layer (Sb-1) and the layer (Sb-2) such that the reinforcing material is substantially in parallel with the layer (Sb-1) and the layer (Sb-2) and that the reinforcing material is not in contact with the layer (Sa),
   an ion exchange capacity of the layer (Sa) is lower than an ion exchange capacity of the layer (Sb-1) and an ion exchange capacity of the layer (Sb-2),
   the ion exchange capacity of the layer (Sb-1) is different from the ion exchange capacity of the layer (Sb-2),
   a ratio of a thickness of the layer (Sa) to a total thickness of the layer (Sb-1) and the layer (Sb-2) is at most 0.4, and
   a difference between an ion exchange capacity of the layer (C) and the ion exchange capacity of the layer (Sa) is at most 0.5 meq/g dry resin.

2. The ion exchange membrane of claim 1, wherein a difference between the ion exchange capacity of the layer (Sa) and an ion exchange capacity of a total of the layer (Sb-1) and the layer (Sb-2) is from 0.01 to 0.5 meq/g dry resin.

3. The ion exchange membrane of claim 1, wherein an ion exchange capacity of a total of the layer (Sb-1) and the layer (Sb-2) is from 0.51 to 2.01 meq/g dry resin.

4. The ion exchange membrane of claim 1, wherein the thickness of the layer (Sa) is from 1 to 50 μm.

5. The ion exchange membrane of claim 1, wherein a total thickness of the layer (Sa) and the layer (Sb-1) is from 30 to 140 μm, and a thickness of the layer (Sb-2) is from 10 to 60 μm.

6. The ion exchange membrane of claim 1, wherein the ion exchange capacity of the layer (C) is from 0.5 to 2.0 meq/g dry resin, and the ion exchange capacity of the layer (Sa) is from 0.5 to 2.0 meq/g dry resin.

7. The ion exchange membrane of claim 1, wherein the thickness of the layer (C) is from 5 to 50 μm.

8. An alkali chloride electrolysis apparatus, comprising:
   an electrolytic cell provided with a cathode and an anode; and
   the ion exchange membrane of claim 1, which is mounted in the electrolytic cell such that inside of the electrolytic cell is separated into a cathode chamber on the cathode side and an anode chamber on the anode side and that the layer (C) is on the cathode side and the layer (Sb-1) and the layer (Sb-2) are on the anode side.

9. The ion exchange membrane of claim 1, wherein a ratio of a thickness of the layer (Sb-2) to a total thickness of the layer (Sa), the layer (Sb-1), and the layer (Sb-2) is from 0.05 to 0.5.

10. The ion exchange membrane of claim 1, wherein a ratio of a thickness of the layer (Sb-2) to a total thickness of the layer (Sa), the layer (Sb-1), and the layer (Sb-2) is from 0.08 to 0.4.

11. The ion exchange membrane of claim 5, wherein the thickness of the layer (Sb-2) is from 10 to 40 μm.

12. The ion exchange membrane of claim 1, wherein a thickness of the reinforcing material is from 80 to 130 μm.

13. The ion exchange membrane of claim 1, which has:
   an electrolysis voltage of 3.09 to 3.14, as measured by disposing the ion exchange membrane in a test electrolytic cell, which has an effective current-carrying area of 1.5 dm$^2$ and comprises a titanium anode coated with a solid solution of ruthenium oxide, iridium oxide and titanium oxide and a SUS304 cathode having ruthenium-containing Raney Nickel electrodeposited thereon, so that the layer (C) faces the cathode, and the electrodes and the ion exchange membrane are directly in contact so as not to leave a gap, and conducting electrolysis of an aqueous sodium chloride solution under conditions of a temperature of 90° C. and a current density of 6 kA/m$^2$ for 3 to 10 days while controlling a sodium hydroxide concentration discharged from an cathode chamber to be 32 mass % and a sodium chloride concentration supplied to an anode chamber to be 200 g/L; and
   a ratio P (%) of 25 to less than 82, as measured by disposing the ion exchange membrane in a test electrolytic cell as defined above, disposing a titanium plate at an upper portion of the electrolytic surface in the anode chamber so as to be spaced by 2.5 mm from the electrode surface outside of the anode, and conducting electrolysis of an aqueous sodium chloride solution for 3 days under such conditions that a concentration of sodium hydroxide discharged from the cathode chamber is 32 mass %, a concentration of sodium chloride supplied to the anode chamber is 200 g/L, a temperature is 90° C. and a current is 120 A, wherein the ratio P is a ratio of a sum of the lengths of the peeled surface in a portion 50 mm from a top of the electrolytic surface of the ion exchange membrane to a length in a width direction of the portion.

14. The ion exchange membrane of claim 13, wherein the ratio P is 25 to 27.

15. The ion exchange membrane of claim 1, wherein the ion exchange capacity of the layer (Sb-1) is lower than the ion exchange capacity of the layer (Sb-2).

16. The ion exchange membrane of claim 1, wherein ion exchange groups in the fluorinated polymer in the layer (C) consist of the at least one carboxylic acid functional group, and ion exchange groups in the fluorinated polymer in each of the layer (Sa), the layer (Sb-1), and the layer (Sb-2) consist of the at least one sulfonic acid functional group.

* * * * *